US009436186B2

(12) United States Patent
Oh et al.

(10) Patent No.: US 9,436,186 B2
(45) Date of Patent: Sep. 6, 2016

(54) CLEANING ROBOT, HOME MONITORING APPARATUS, AND METHOD FOR CONTROLLING THE CLEANING ROBOT

(71) Applicant: Samsung Electronics Co., Ltd., Suwon-si, Gyeonggi-do (KR)

(72) Inventors: Hee Jin Oh, Seoul (KR); Kyung Jae Kim, Suwon-si (KR); Hyun Suk Min, Suwon-si (KR); Sung Geun Song, Incheon (KR); Chang Seok Lee, Daejeon (KR); Ho Yeon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 14/256,557

(22) Filed: Apr. 18, 2014

(65) Prior Publication Data

US 2014/0324271 A1 Oct. 30, 2014

(30) Foreign Application Priority Data

Apr. 26, 2013 (KR) .......................... 10-2013-0046624

(51) Int. Cl.
*G05D 1/02* (2006.01)
(52) U.S. Cl.
CPC .... *G05D 1/0246* (2013.01); *G05D 2201/0203* (2013.01)
(58) Field of Classification Search
CPC .............................................. G05D 2201/0203
See application file for complete search history.

(56) References Cited

U.S. PATENT DOCUMENTS

| 6,584,376 B1 * | 6/2003 | Van Kommer | G05D 1/0285 379/88.03 |
|---|---|---|---|
| 7,206,753 B2 | 4/2007 | Bancroft et al. | |
| 2002/0153184 A1 * | 10/2002 | Song | A47L 9/009 180/167 |
| 2006/0237158 A1 * | 10/2006 | Shim | A47L 9/2805 164/18 |
| 2007/0096675 A1 * | 5/2007 | Kim | G05D 1/0225 318/587 |
| 2008/0039974 A1 * | 2/2008 | Sandin | G05D 1/028 700/258 |
| 2010/0228394 A1 * | 9/2010 | Yi | G05D 1/0246 700/253 |
| 2011/0264305 A1 * | 10/2011 | Choe | G05D 1/0246 701/2 |
| 2012/0221187 A1 * | 8/2012 | Jeon | A47L 9/009 701/26 |
| 2012/0259481 A1 * | 10/2012 | Kim | G05D 1/0016 701/2 |
| 2013/0116825 A1 * | 5/2013 | Kim | A47L 11/20 700/259 |
| 2013/0116826 A1 * | 5/2013 | Kim | G05D 1/0246 700/259 |

(Continued)

FOREIGN PATENT DOCUMENTS

| JP | 2002354139 A | * 12/2002 |
|---|---|---|
| KR | 1020060027728 | 3/2006 |

(Continued)

*Primary Examiner* — Mussa A Shaawat
*Assistant Examiner* — Thomas Ingram
(74) *Attorney, Agent, or Firm* — Jefferson IP Law, LLP

(57) ABSTRACT

A cleaning robot is provided. The cleaning robot includes a main body, a moving assembly to move the main body around a home, an imaging unit to obtain images around the main body, a controller to generate a map of the home using the obtained images, and a communication unit to transmit the generated map to a home monitoring apparatus. A procedure to match location and type information of electric devices to a two-Dimensional (2D) or three-Dimensional (3D) map of the home may be automated. As described above, the map of the home may be realistically generated by utilizing a map generated by the cleaning robot and inconvenience experienced by a user to manually register electric devices located in each room of the home may be solved by automatically registering the electric devices.

24 Claims, 17 Drawing Sheets

(56) References Cited

U.S. PATENT DOCUMENTS

| | | | | |
|---|---|---|---|---|
| 2013/0138246 A1* | 5/2013 | Gutmann | ............ | G05D 1/0231 700/253 |
| 2013/0232717 A1* | 9/2013 | Lee | ............ | G05D 1/0255 15/319 |
| 2013/0326839 A1* | 12/2013 | Cho | ............ | A47L 9/2805 15/319 |
| 2014/0207282 A1* | 7/2014 | Angle | ............ | H04L 12/282 700/257 |
| 2014/0303775 A1* | 10/2014 | Oh | ............ | G05D 1/0016 700/253 |
| 2015/0362921 A1* | 12/2015 | Hanaoka | ............ | G01B 11/24 701/23 |

FOREIGN PATENT DOCUMENTS

| | | |
|---|---|---|
| KR | 1020060032877 A | 4/2006 |
| KR | 1020070027840 | 3/2007 |
| KR | 1020110119118 | 11/2011 |

\* cited by examiner

CLEANING ROBOT, HOME MONITORING APPARATUS, AND METHOD FOR CONTROLLING THE CLEANING ROBOT

CROSS-REFERENCE TO RELATED APPLICATION(S)

This application claims the benefit under 35 U.S.C. §119 (a) of a Korean patent application filed on Apr. 26, 2013 in the Korean Intellectual Property Office and assigned Serial number 10-2013-0046624, the entire disclosure of which is hereby incorporated by reference.

TECHNICAL FIELD

The present disclosure relates to a cleaning robot to clean a home, a home monitoring apparatus to communicate with the cleaning robot, and a method for controlling the cleaning robot.

BACKGROUND

A home monitoring apparatus is an apparatus to monitor the state of a home at home or at a remote location through the Internet, by installing a camera and server at home or target area to be monitored, and accessing the server using a terminal device to monitor the home or target area.

Currently, a home monitoring apparatus performs functions related to automation and energy saving of home devices in addition to a monitoring function for security. This is also called a smart home.

A smart home has the concept of intelligent house or service house, and includes automation of a house or a part of a building by interconnecting various electric and electronic devices of a home through an internal network, and controlling them through an external network.

In addition, a smart home controls the time and amount of power consumption by checking energy consumption in real time, thereby achieving power saving.

A home monitoring apparatus receives information about the internal structure of a home and information about devices from a user, outputs the states of the devices by communicating with the devices, and measures and informs the amount of power consumption to the user.

In this case, the user experiences great inconvenience to manually input the information about the internal structure of the home and the information about the devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a cleaning robot to generate a map of a home while moving around the home, to apply location information of electric devices disposed around the home to the generated map by communicating with the electric devices, and to transmit the map, to which the location information of the electric devices is applied, to a home monitoring apparatus, and a method for controlling the cleaning robot.

Another aspect of the present disclosure is to provide a home monitoring apparatus to receive a map, to which location information of electric devices disposed around a home is applied, from a cleaning robot by communicating with the cleaning robot, to display the received map, and to control operations of the electric devices.

Additional aspects of the disclosure will be set forth in part in the description which follows and, in part, will be obvious from the description, or may be learned by practice of the disclosure.

In accordance with an aspect of the present disclosure, a cleaning robot is provided. The cleaning robot includes a main body, a moving assembly to move the main body around home, an imaging unit to obtain images around the main body, a controller to generate a map of a home using the obtained images, and a communication unit to transmit the generated map to a home monitoring apparatus.

The communication unit may communicate with electric devices near the main body to receive basic information from the electric devices and to transmit the received basic information to the controller.

The controller may perform image processing on the images and recognize electric devices in the image-processed images.

The imaging unit may include a first image capturing unit and a second image capturing unit aligned at different locations of the main body.

The first and second image capturing units may respectively capture two-Dimensional (2D) images, and the controller may perform image processing on the captured 2D images to obtain a three-dimensional (3D) image, recognize electric devices based on the obtained 3D image, and generate a map to which the recognized electric devices are matched.

The first image capturing unit may capture a 2D image while the second image capturing unit captures a 3D image, and the controller may perform image processing on at least one of the 2D and 3D images to recognize electric devices, and generates a map by distinguishing rooms of the home based on the 3D image.

The controller may be configured to detect location information of electric devices if the electric devices are recognized, and match the detected location information to the map.

The cleaning robot may further include a storage to store the location information of the electric devices using 3-axis values.

The cleaning robot may further include a cleaning tool to collect foreign substances on a floor of a home, and the controller may control operations of the moving assembly and the cleaning tool if a current mode is a cleaning mode, recognize an electric device disposed around the home while performing cleaning, determine whether the recognized electric device is a new electric device or a pre-registered electric device, and update the map upon determining that the recognized electric device is the new electric device.

The cleaning robot may further include a voice detector to detect voice, and the controller may control the moving assembly to move to a location corresponding to the detected voice.

The voice detector may include a microphone array, and the controller may recognize a location corresponding to voice detected by the microphone array.

The controller may recognize the voice detected by the microphone array and determine a room designated by the recognized voice.

The voice detector may include one microphone, and the controller may recognize voice detected by the microphone and determine a room designated by the recognized voice.

The home monitoring apparatus may be located at a charger station to supply power to the main body, and display information about electric devices matched to the map of a home.

The home monitoring apparatus may be located at the main body, and display information about electric devices matched to the map of a home.

The communication unit may communicate with the home monitoring apparatus located at home separately from the main body.

In accordance with another aspect of the present disclosure, a method for controlling a cleaning robot having a main body, a moving assembly to move the main body around home, and an imaging unit to obtain images around the main body is provided. The method includes determining whether an operation command is a command to execute a map generating mode if the operation command is input, operating and moving the moving assembly around home if the operation command is a command to execute a map generating mode, obtaining images around the main body while moving around a home, generating a map of the home based on the obtained images, recognizing electric devices disposed around the home by performing image processing on the obtained images, matching the recognized electric devices to the generated map, and transmitting the map to which the electric devices are matched, to a home monitoring apparatus.

The obtaining of the images may include obtaining a plurality of 2D images.

The recognizing of the electric devices may include generating a 3D image using the 2D images, distinguishing rooms of the home using the generated 3D image, and recognizing electric devices disposed in each room of the home.

The obtaining of the images may include obtaining a 2D image and a 3D image.

The recognizing of the electric devices may include distinguishing rooms of the home using the 3D image, and recognizing electric devices of each room of the home using at least one of the 2D and 3D images.

The method may further include determining whether basic information is received from at least one electric device, while moving around the home, detecting location information of the electric device upon determining that the basic information is received from the electric device, and matching the basic information and location information of the electric device to the map.

The method may further include operating and moving the moving assembly around the home to perform cleaning if the operation command is a command to execute a cleaning mode, obtaining images around the main body while performing the cleaning, recognizing an electric device by performing image processing on the obtained images, determining whether the recognized electric device is a new electric device, detecting basic information and location information of the recognized electric device upon determining that the recognized electric device is the new electric device, and updating the map by matching the detected basic information and location information of the electric device to the map.

The method may further include detecting location information of the recognized electric device upon determining that the recognized electric device is a pre-registered electric device, determining whether the detected location information of the electric device is identical to pre-stored location information of the electric device, and updating the map by re-storing the location information of the electric device as the detected location information if the detected location information is different from the pre-stored location information.

The method may further include re-transmitting the updated map to the home monitoring apparatus.

The recognizing of the electric device may further include determining whether basic information is received from at least one electric device, while moving around the home.

In accordance with another aspect of the present disclosure, a home monitoring apparatus is provided. The home monitoring apparatus includes a communication unit to receive a map to which location information of electric devices disposed around a home is matched, from a cleaning robot, and to communicate with at least one of the electric devices, a controller to control operation of the electric device based on the received map, and a display unit to display the map and operation information of the electric device.

The map may include location information of electric devices disposed in each room of the home, and the controller may control power consumption of each room of the home based on the location information of the electric devices disposed in the room.

The home monitoring apparatus may further include an input unit to receive information about an unregistered electric device.

The home monitoring apparatus may further include an input unit to receive operation information of the electric device, and the controller may control operation of the electric device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, of which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
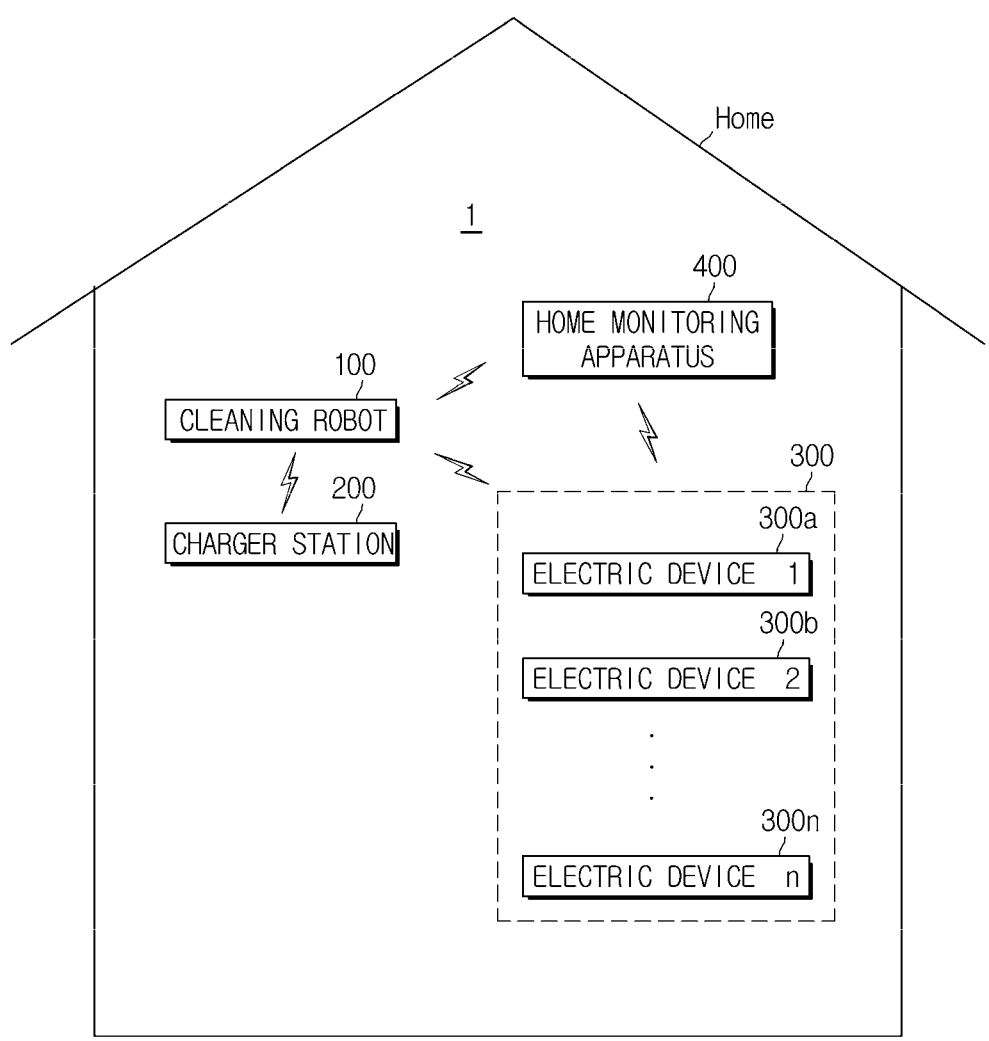
FIG. 1 is a structural view of a home service system including a cleaning robot, and a home monitoring apparatus to communicate with the cleaning robot and a plurality of electric devices according to an embodiment of the present disclosure.

FIG. 1 is a structural view of a home service system 1 including a cleaning robot 100, and a home monitoring apparatus 400 to communicate with the cleaning robot 100 and a plurality of electric devices 300a, 300b, . . . , 300n (collectively referred to as 300) according to an embodiment of the present disclosure.

When a cleaning command of a user is input or a time for cleaning is reached, the cleaning robot 100 performs cleaning by picking foreign substances such as dust while autonomously traveling around a cleaning area of a home.

The cleaning robot 100 generates a map of the home before cleaning the home and then performs cleaning based on the generated map.

The cleaning robot 100 may generate and store the map when it first starts cleaning, periodically, or according to a user command.

Alternatively, the cleaning robot 100 may perform cleaning in a cleaning mode while randomly traveling around the home without using the map.

The cleaning robot 100 may receive basic information of the electric devices 300 disposed around the home from the electric devices 300 by communicating with the electric devices 300. Here, the basic information includes names of the electric devices 300.

If a cleaning stop command is received from the user, if it is determined that cleaning is completed, or if the battery is lower than a reference level, the cleaning robot 100 is docked on a charger station 200 and then charged by receiving power from the charger station 200 after docking is completed.

Here, the charger station 200 may include a transformer connected to an external commercial AC power supply to receive and convert commercial AC power, a rectifier to half-wave or full-wave rectify the converted power, a smoother to smooth the rectified power, and a voltage adjuster to output the smoothed power as DC power having a specific voltage, and the DC power output from the voltage adjuster is supplied to the cleaning robot 100 through a power terminal.

The charger station 200 further includes a docking communication unit (not shown) to transmit and receive a docking signal for docking of the cleaning robot 100, to and from the cleaning robot 100.

The electric devices 300 are communicable devices disposed around the home, and include home appliances to perform preset unique functions and additional functions at home. For example, the home appliances include lighting devices, television, air conditioner, refrigerator, washing machine, and the like.

The electric devices 300 further include a monitoring device (not shown) for security, a heater such as a boiler, a gas valve, etc.

The electric devices 300 periodically transmit basic information thereof to outside of the electric devices 300, and communicate with the home monitoring apparatus 400 to transmit operation information to the home monitoring apparatus 400. Here, the basic information of the electric devices 300 includes information such as names of the electric devices 300.

If a control command is received from the home monitoring apparatus 400, each electric device 300 performs operations based on the received control command.

Each electric device 300 may optionally include a Near Field Communication (NFC) or Radio Frequency Identification (RFID) tag including the basic information.

The home monitoring apparatus 400 applies smart home solutions to the home and performs a variety of functions such as security monitoring, visitor checking, phone calling, door opening, entrance and exit control, and event notification as well as home control functions such as lighting control, gas valve control, heating control, energy consumption checking, energy control, device control based on a user interface, and the like.

The home monitoring apparatus 400 communicates with the cleaning robot 100 and the electric devices 300. The home monitoring apparatus 400 also communicates with a monitoring device for security.

The home monitoring apparatus 400 receives the map of the home and location information of the electric devices 300 from the cleaning robot 100, and displays the received map and location information. Here, the location information of the electric devices 300 is matched to the map.

The home monitoring apparatus 400 receives operation information from the electric devices 300, and transmits a control command to at least one of the electric devices 300. Here, the control command is input by the user or determined based on the power state of a home.

Figure 2:
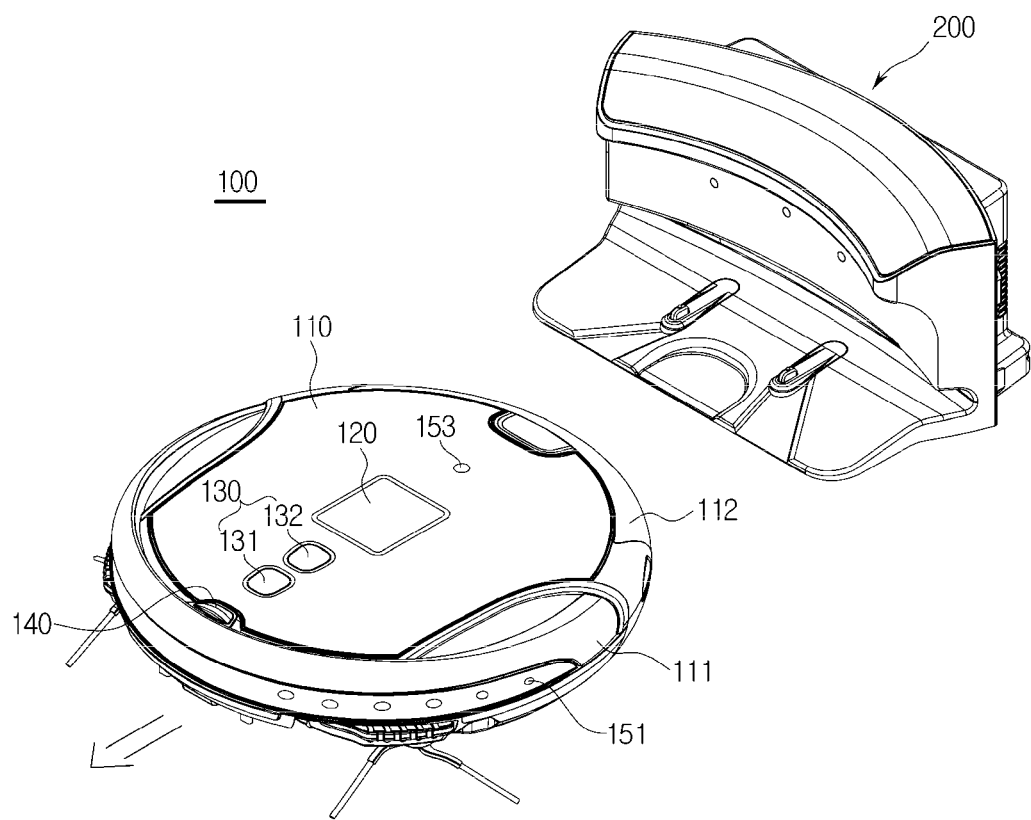
FIG. 2 is a perspective view of the cleaning robot according to an embodiment of the present disclosure.
Figure 3:
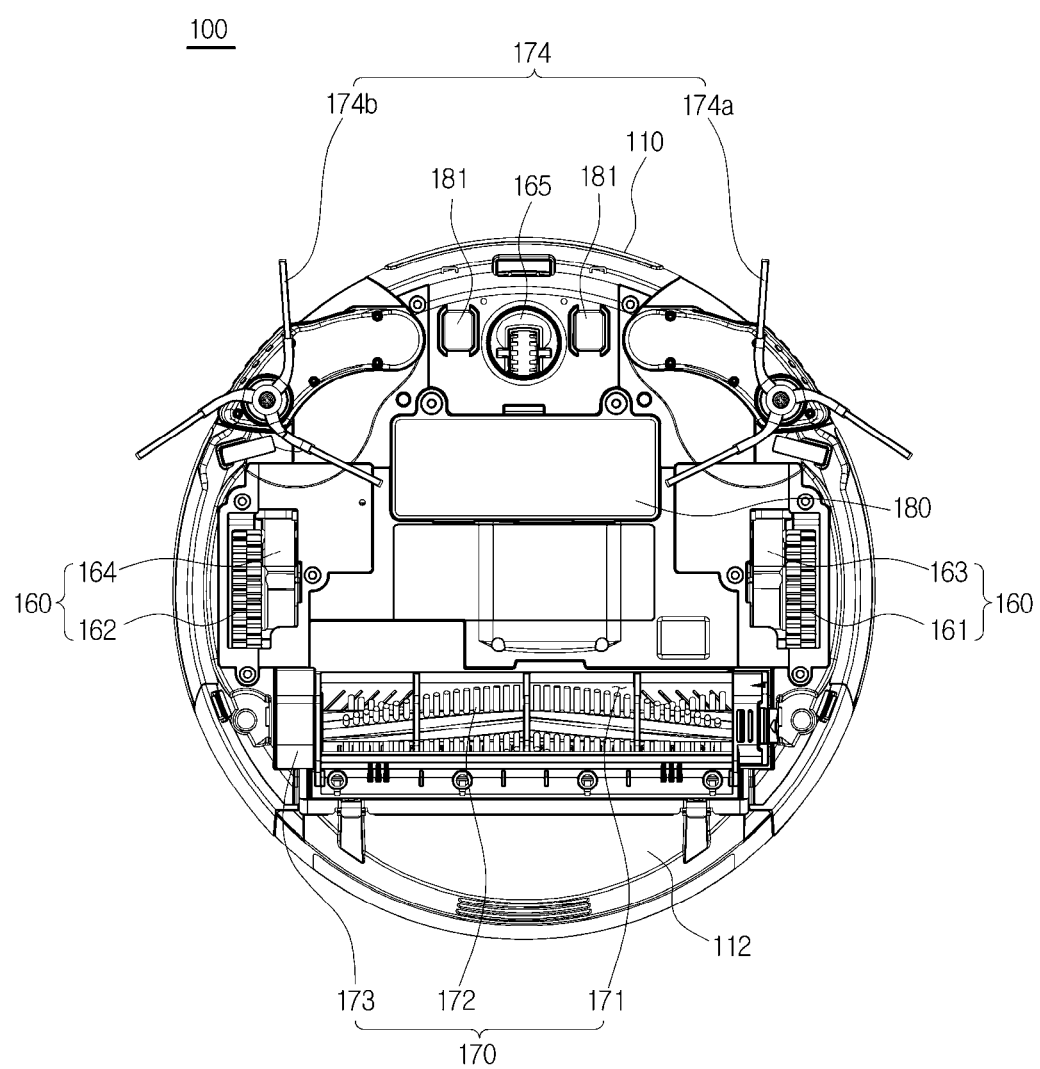
FIG. 3 is a bottom view of the cleaning robot according to an embodiment of the present disclosure.

A detailed description is now given of the cleaning robot 100 with reference to FIGS. 2 and 3.

FIG. 2 is a perspective view of the cleaning robot 100 according to an embodiment of the present disclosure, and FIG. 3 is a bottom view of the cleaning robot 100 according to an embodiment of the present disclosure.

As illustrated in FIG. 2, the cleaning robot 100 includes a main body 110 to form an external shape, a bumper 111 mounted at a front side of the main body 110 to cushion the impact of a collision with an obstacle, a user interface 120 mounted on a top surface of the main body 110 to receive operation information and reservation information and to display operation information, an imaging unit 130 (131 and 132) integrally mounted on the top surface of the main body 110 to obtain images around the main body 110 in a cleaning area, and a communication unit 140 to communicate with an external device such as the charger station 200.

Here, the obtained images are used to generate a map of a home and to recognize the electric devices 300 disposed around the home. The obtained images may also be used to recognize the location of the main body 110 and to detect obstacles in a cleaning mode.

The imaging unit 130 includes a first image capturing unit 131 and a second image capturing unit 132. The first and second image capturing units 131 and 132 may be aligned in a traveling direction as illustrated in FIG. 2, or in a direction perpendicular to the traveling direction, but are not limited thereto.

The bumper 111 may be further mounted at a rear side of the main body 110, but is not limited thereto and thus the bumper 111 may be mounted on other portions of the main body 110.

The cleaning robot 100 further includes a dustbin 112 provided at a rear side of the main body 110 near a main brush assembly 170 (see FIG. 3), but not limited thereto, to accommodate foreign substances such as dust collected by the main brush assembly 170.

The cleaning robot 100 may further include an obstacle detector 151 mounted at front, left, and right sides of the main body 110 to detect obstacles located at front, left, and right sides of the cleaning robot 100.

The cleaning robot 100 may use an obstacle detection signal detected by the obstacle detector 151, to generate the map. For example, the cleaning robot 100 may recognize furniture such as a sofa or a dining table as an obstacle and apply the recognized furniture to the map.

The cleaning robot 100 may further include a sound detector 153 provided on the main body 110 to detect sound in the home. Here, the sound includes voice of the user.

As illustrated in FIG. 3, the cleaning robot 100 includes a moving assembly 160 mounted at a bottom part of the main body 110 to move the main body 110, a cleaning tool (170 and 174) mounted at the bottom part of the main body 110 to sweep or scatter dust on the floor and to pick up the swept or scattered dust, and a power supply 180 to supply driving power to each component.

The moving assembly 160 includes a pair of wheels 161 and 162 mounted at left and right sides of a central area of the main body 110 to rotate the cleaning robot 100 and move the cleaning robot 100 forward or backward, wheel motors 163 and 164 to respectively apply driving forces to the wheels 161 and 162, and a caster wheel 165 mounted at the front side of the main body 110 to change directions depending on the state of the floor on which the cleaning robot 100 moves.

Here, the wheels 161 and 162 are symmetrically aligned on the main body 110.

The caster wheel 165 supports the cleaning robot 100 to be stable and not to fall, and is formed as a roller or a caster-shaped wheel.

The cleaning tool (170 and 174) includes the main brush assembly 170 mounted at the bottom part of the main body 110 to sweep or scatter dust on the floor and to pick up the swept or scattered dust, and a side brush assembly 174 mounted at the bottom part of the main body 110 and protruding from the bottom part of the main body 110 to sweep dust in areas other than an area to be cleaned by the main brush assembly 170, toward the main brush assembly 170.

The main brush assembly 170 includes a main brush 172 provided in a suction hole 171 at the bottom part of the main body 110 to sweep or scatter dust on the floor under the main body 110, and a brush motor 173 to rotate the main brush 172.

Here, the main brush 172 includes a roller mechanically connected to the brush motor 173, and a brush member mounted on the outer circumferential surface of the roller. That is, the roller of the main brush 172 is rotated due to driving of the brush motor 173 to rotate the brush member mounted on the roller. In this case, the brush member of the main brush 172 sends dust on the floor into the suction hole 171.

The cleaning robot 100 may collect foreign substances such as dust using a suction force.

That is, the main brush assembly 170 may further include a suction part provided inside the main body 110 around the main brush to generate a suction force into the suction hole 171.

Here, the suction part includes a fan (not shown). That is, the suction part of the main brush assembly 170 uses an air blowing force of the fan to guide dust entering the suction hole 171 toward the dustbin 112, and the air blowing force may be controlled by a controller.

The side brush assembly 174 sweeps dust on the floor in areas, which cannot be swept by the main brush 172 at front left and front right sides of the main body 110, toward the suction hole 171 to improve the efficiency of cleaning, and includes a first side brush assembly 174a located at the front left side of the main body 110 and a second side brush assembly 174b located at the front right side of the main body 110.

Each of the first and second side brush assemblies 174a and 174b includes a body detachably mounted on the main body 110, side arms rotatably mounted on the body and protruding from the main body 110, and side brushes rotatably mounted on the side arms and protruding from the main body 110.

Alternatively, each of the first and second side brush assemblies 174a and 174b may include only side brushes rotatably mounted at the front left and front right sides of the main body 110.

The power supply 180 includes a battery electrically connected to various components mounted on the main body 110 to supply driving power to the components.

Here, the battery is a rechargeable secondary battery, electrically connected to the charger station 200 through two charging terminals 181, and charged by receiving power from the charger station 200.

The cleaning robot 100 performs cleaning while not only automatically traveling around a cleaning area based on, for example, an obstacle detection signal detected by the obstacle detector 151, but also traveling around the cleaning area by reflecting the user's intention.

That is, when the cleaning robot 100 performs cleaning in an automatic mode, the cleaning robot 100 checks obstacles such as furniture, office supplies, and walls located in the cleaning area and distances to the obstacles using the obstacle detector 151, and cleans the cleaning area while autonomously changing directions by driving the wheels 161 and 162 of the moving assembly 160 according to the result of checking.

Figure 4:
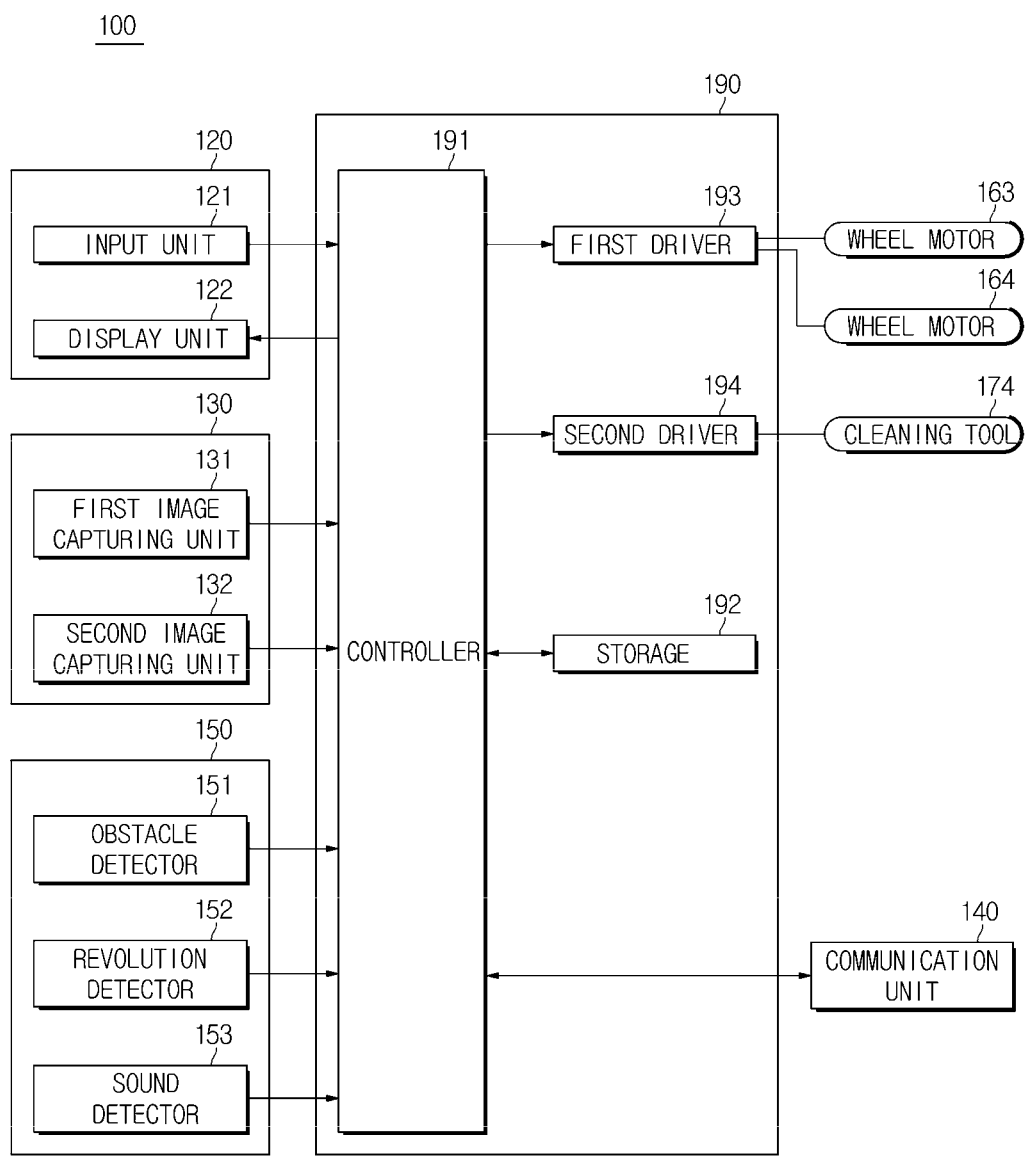
FIG. 4 is a control block diagram of the cleaning robot according to an embodiment of the present disclosure.

FIG. 4 is a control block diagram of the cleaning robot 100 according to an embodiment of the present disclosure. The cleaning robot 100 includes the user interface 120, the imaging unit 130, the communication unit 140, a detection unit 150, and a driving module 190.

The user interface 120 receives a command from the user and displays an operation state or the like.

The user interface 120 includes an input unit 121 to receive cleaning reservation information, cleaning start/stop command, map generating command, operation mode, traveling pattern, etc., and a display unit 122 to display cleaning reservation information, battery level, dust level, traveling pattern, operation mode, etc.

Here, the operation mode includes a cleaning mode, map generating mode, standby mode, docking mode, reservation mode, etc.

The user interface 120 may be formed as a touchscreen.

A power on/off button of the user interface 120 may be provided separately from the touchscreen.

The input unit 121 of the user interface 120 may be formed as a touch pad, and the display unit 122 may be formed as a Liquid Crystal Display (LCD), but is not limited thereto.

The imaging unit 130 obtains images around the main body 110. Here, the imaging unit 130 obtains images in an upward direction opposite to a direction toward the floor.

The imaging unit 130 may obtain images around the main body 110 to generate a map of a home in a map generating mode and to recognize the location of the main body 110 and to detect obstacles in a cleaning mode.

The imaging unit 130 includes the first and second image capturing units 131 and 132.

Each of the first and second image capturing units 131 and 132 includes a two-Dimensional (2D) color camera and captures a 2D color image using the 2D color camera. In this case, two 2D color images respectively captured by the first and second image capturing units 131 and 132 are used to obtain a three-Dimensional (3D) image.

Each of the first and second image capturing units 131 and 132 may include an Infrared (IR) transceiver.

Alternatively, the first image capturing unit 131 may include a 2D color camera and the second image capturing unit 132 may include a 3D camera, e.g., a depth camera.

As described above, the cleaning robot 100 checks the internal structure of a home by obtaining a 3D image using at least two cameras.

The imaging unit 130 may operate both the first and second image capturing units 131 and 132 in a map generating mode and operate only the first image capturing unit 131 in a cleaning mode.

The communication unit 140 communicates with the charger station 200 in a docking mode.

The communication unit 140 may also communicate with a remote controller (not shown) to manipulate operation of the cleaning robot 100.

The communication unit 140 communicates with the electric devices 300 in a map generating mode and cleaning mode. In this case, the communication unit 140 receives basic information from the electric devices 300.

The communication unit 140 communicates with the home monitoring apparatus 400 and transmits the map to the home monitoring apparatus 400.

The communication unit 140 may also transmit operation information of the cleaning robot 100.

The communication unit 140 communicates with the home monitoring apparatus 400 and the electric devices 300 using at least one of various wired/wireless communication protocols such as ZigBee, Z-Wave, WiFi, and Ethernet.

The communication unit 140 performs at least one of Radio Frequency (RF) communication, IR communication, and ultrasonic communication for docking.

The communication unit 140 may read NFC or RFID tags attached on the electric devices 300. These tags have recorded thereon the basic information of the electric devices 300.

The detection unit 150 may include the obstacle detector 151 mounted on the main body 110 of the cleaning robot 100 to detect obstacles in a cleaning area, and a revolution detector 152 to detect the number of revolutions of the wheel motors 163 and 164 to predict a moving distance of the main body 110.

That is, the cleaning robot 100 may generate a map using the images obtained by the imaging unit 130, the result of detecting obstacles by the obstacle detector 151, and the number of revolutions of the wheel motors 163 and 164, and travel using the generated map in a cleaning mode.

The detection unit 150 further includes the sound detector 153 to detect sound of a home.

Here, the sound detector 153 includes one microphone or microphone array.

The cleaning robot 100 may use both a microphone and microphone array as the sound detector 153 to increase the accuracy of detecting a location to be cleaned.

The driving module 190 drives the user interface 120 for information input and output and the imaging unit 130 for image obtaining, and also drives the moving assembly 160 and the cleaning tool (170 and 174) based on information input to the user interface 120, images obtained by the imaging unit 130, and detection information of the detection unit 150. The driving module 190 includes a controller 191, a storage 192, a first driver 193, and a second driver 194.

When a current mode is a map generating mode, the controller 191 controls driving of the moving assembly 160 and generates a map of a home based on the images obtained by the imaging unit 130.

In this case, map generation is determined depending on functions of the first image capturing unit 131, the second image capturing unit 132, and the communication unit 140. Examples of map generation are now described.

For example, the controller 191 checks the location of a room and determines whether any electric device 300 exists, based on a 2D image captured by the first image capturing unit 131 and a 3D image captured by the second image capturing unit 132, detects the type and location information of the electric device 300 by performing image processing on the 2D or 3D image upon determining that the electric device 300 exists, and generates a map of a home by applying the detected location information to the map.

As another example, the controller 191 generates a 3D image using a 2D image captured by the first image capturing unit 131 and a 2D image captured by the second image capturing unit 132 if the two captured 2D images are received, checks the location of a room based on the generated 3D image, determines whether any electric device 300 exists, based on at least one image among the two 2D images and the 3D image, detects the type and location information of the electric device 300 by performing image processing on the at least one image upon determining that the electric device 300 exists, and generates a map of a home by applying the detected location information to the map.

As another example, the controller 191 generates a map while checking the location of a room based on a 2D image captured by the first image capturing unit 131 and a 3D image captured by the second image capturing unit 132, determines whether basic information is received from the electric devices 300, by periodically communicating with the electric devices 300 while generating the map, and applies the basic information to the map upon determining that the basic information is received from the electric devices 300. In this case, the controller 191 detects location information of the electric devices 300 by performing image processing on the 2D or 3D image.

The controller 191 receives basic information from the communication unit 140 only when the basic information is included in a received signal having a size equal to or greater than a reference size.

If a signal is received via the communication unit 140, the controller 191 may control the main body 110 to move in a direction from which the signal is received.

As another example, the controller 191 predicts the size or shape of a room based on a detection signal of the revolution detector 152, predicts the size, shape, location, etc. of obstacles such as furniture based on a detection signal of the obstacle detector 151, and then generates a map in a map generating mode based on images obtained by the imaging unit 130 and basic information of the electric devices 300 received by the communication unit 140, by applying the predicted information to the map.

The controller 191 distinguishes spaces of a home using a time difference between images in a map generating mode, or a time difference or distortion level of light transmitted from and reflected back to an IR device.

When a current mode is a cleaning mode, the controller 191 controls operations of the moving assembly 160 and the cleaning tool (170 and 174) to clean a cleaning area of a home.

The controller 191 periodically communicates with the electric devices 300 in a cleaning mode, receives basic information from an electric device 300 with which the controller 191 currently communicates, determines whether the electric device 300 is previously registered, registers the electric device 300 as a new device upon determining that the electric device 300 is not previously registered, detected current location information of the electric device 300 upon determining that the electric device 300 is previously registered, terminates recognition of the electric device 300 if the detected current location information is identical to stored location information, and re-stores the location information of the electric device 300 if the detected current location information is different from the stored location information. That is, the controller 191 updates information stored in the storage 192.

When a new device is registered, the controller 191 detects location information, stores the detected location information together with basic information, and controls transmission of a map including information about the newly registered electric device.

The controller 191 may perform cleaning based on the map stored in the storage 192 or a traveling pattern in a cleaning mode. Here, the traveling pattern is a preset pattern or a pattern selected by the user.

If voice of the user is detected in a cleaning mode, the controller 191 may recognize the detected voice and control moving to a location from which the voice is recognized.

In this case, the recognizing of the voice includes recognizing a name of a room from the voice, or recognizing a location from which the voice is uttered, but ins not limited thereto.

For example, if the sound detector 153 is a microphone, the controller 191 recognizes a voice detected using the microphone to check a name of a room and controls the moving assembly 160 to move to the room having the checked name.

Alternatively, if the sound detector 153 is a microphone array, the controller 191 recognizes an utterance location by performing signal processing such as beamforming and controls the moving assembly 160 to move to the recognized utterance location.

In addition, the controller 191 may recognize a location using both the microphone and microphone array and control the moving assembly 160 to move to the recognized location.

The storage 192 stores the map of a home and the basic information and location information of the electric devices 300 on the map. In this case, the storage 192 stores the location information of the electric devices 300 of each room in 3-axis directions, for example, using X-, Y-, and Z-axis values. Here, the map includes the location information of each room.

The storage 192 stores reference images according to the types of electric devices.

The storage 192 may also store voice corresponding names of rooms.

The first driver 193 drives the wheel motors 163 and 164 of the moving assembly 160 based on a command of the controller 191. In this case, the main body 110 may change directions by applying different rotation speeds to the wheel motors 163 and 164.

The second driver 194 drives the brush motor 173 of the cleaning tool (170 and 174) based on a command of the controller 191.

Figure 5:
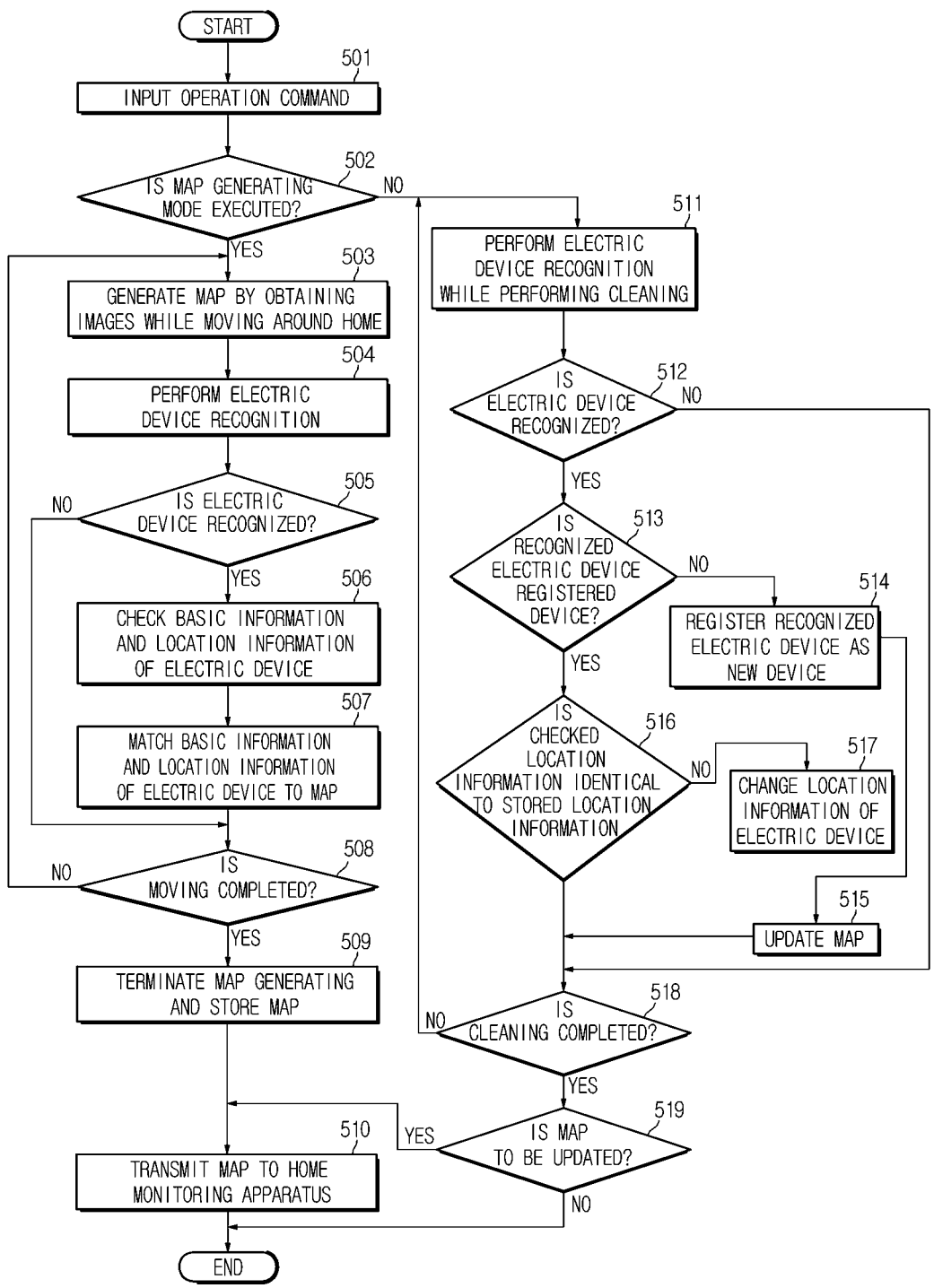
FIG. 5 is a flowchart of a method of controlling the cleaning robot according to an embodiment of the present disclosure.

FIG. 5 is a flowchart of a method for controlling the cleaning robot 100, according to an embodiment of the present disclosure.

The cleaning robot 100 is powered on and performs an operation corresponding to an operation command if the operation command is input via the user interface 120 at operation 501.

The cleaning robot 100 determines whether the input operation command is a command to execute a map generating mode at operation 502.

If a current mode is a map generating mode, the cleaning robot 100 operates the moving assembly 160 and the imaging unit 130 to obtain images of a home while moving around home and generates a map using the obtained images at operation 503.

The cleaning robot 100 generates the map of a home by spatially distinguishing rooms of a home and sets names of the spatially distinguished rooms.

Here, the names of the rooms are set using numbers according to moving of the cleaning robot 100, and each name may be reset as a new name or changed to a new number by the user later.

Distinguishing of the rooms includes determining whether a specific space of a 3D image corresponds to a room spatially independent from a current room, using depth information of the 3D image.

In addition, when the map is generated, the cleaning robot 100 may predict the size or shape of a room based on a detection signal of the revolution detector 152, predict the size, shape, location, etc. of obstacles such as furniture based on a detection signal of the obstacle detector 151, and apply the predicted information to the map.

Then, while the map is being generated, the cleaning robot 100 performs electric device recognition in a room where the main body 110 is currently located at operation 504, determines whether any electric device 300 exists, based on the result of recognition at operation 505, continues moving upon determining that no electric device 300 exists, and detect basic information and location information of an electric device 300 upon determining that the electric device 300 exists at operation 506.

Then, the cleaning robot 100 applies the basic information and location information of the recognized electric device 300 to the map at operation 507.

A description is now given of Examples (1) to (3) in which information about the electric devices 300 is applied to the map.

(1) An example in which the first and second image capturing units 131 and 132 of the imaging unit 130 respectively capture 2D color images is now described.

If a first 2D image captured by the first image capturing unit 131 and a second 2D image captured by the second image capturing unit 132 are received, the cleaning robot 100 generates a 3D image using the received first and second 2D images.

Then, the cleaning robot 100 recognizes rooms and checks the locations of the rooms based on the first and second 2D images and the 3D image, determines whether an object regarded as an electric device 300 is recognized in at least one image among the first and second 2D images and the 3D image, and detects the type and location information of the electric device 300 by performing image processing on the at least one image upon determining that the object regarded as the electric device 300 is recognized.

Here, the type of the electric device 300 may be checked by determining whether an image of the recognized electric device 300 is matched to one of a plurality of reference images of electric devices stored in the storage 192, and detecting basic information corresponding to the reference image if the image of the recognized electric device 300 is matched to the reference image.

The detecting of the location information of the electric device 300 includes checking a moving distance based on the number of revolutions detected by the revolution detector 152, checking the location of the main body 110 in a room based on the checked moving distance to obtain X- and Y-axis values, and detecting height information of the electric device 300 based on an image to obtain a Z-axis value, but is not limited thereto.

Then, the cleaning robot 100 generates a map of a home by matching the basic information and location information corresponding to the checked type of the electric device 300, to room information of the map.

(2) An example in which the first and second image capturing units 131 and 132 of the imaging unit 130 respectively capture a 2D image and a 3D image is now described with reference to FIGS. 6A to 6D.

FIGS. 6A, 6B, 6C, and 6D are diagrams for describing how the cleaning robot generates a map according to an embodiment of the present disclosure.

The cleaning robot 100 recognizes rooms and checks the locations of the rooms based on a 2D image captured by the first image capturing unit 131 and a 3D image captured by the second image capturing unit 132.

Figure 6A:
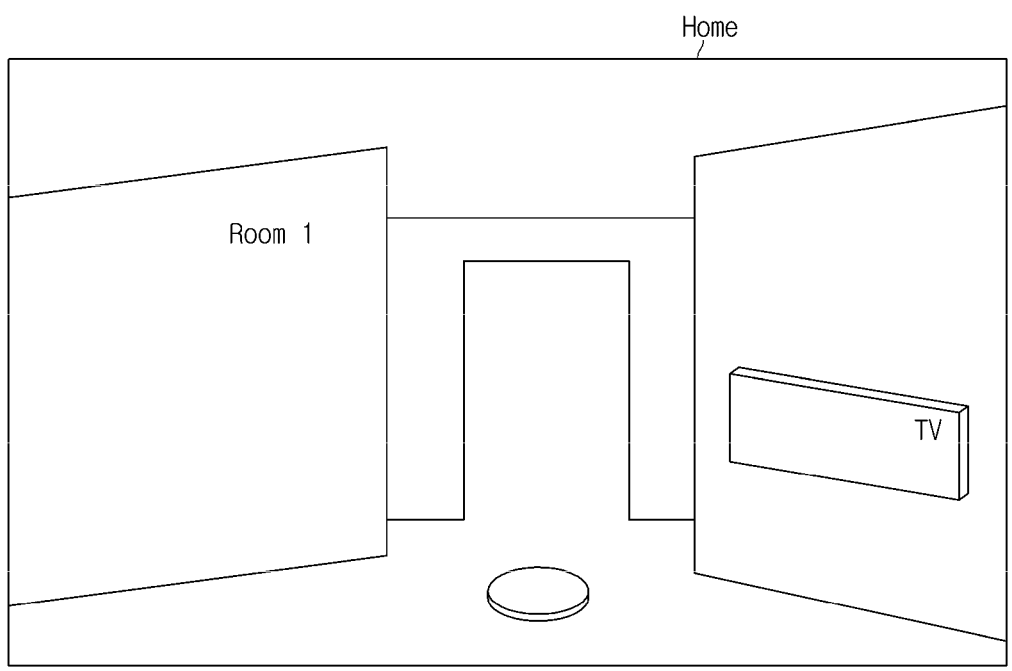
FIGS. 6A, 6B, 6C, and 6D are diagrams for describing how the cleaning robot generates a map according to an embodiment of the present disclosure.

As illustrated in FIG. 6A, the cleaning robot 100 sets a first room to travel among spaces of a home, as Room 1, and obtains 2D and 3D images while moving around Room 1.

Figure 6B:
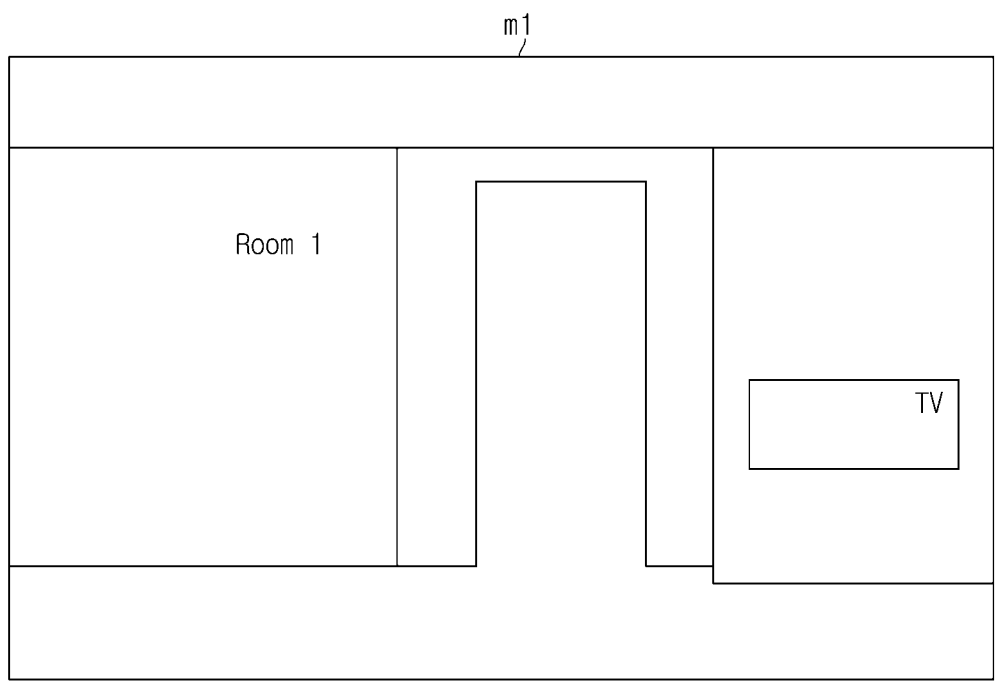
Figure 6C:
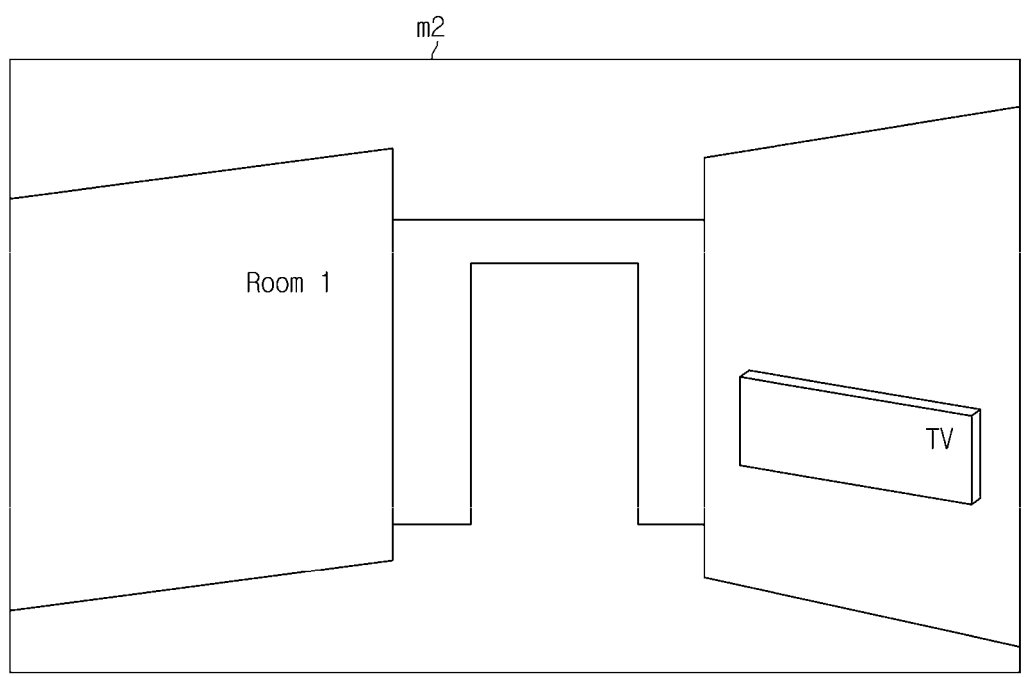

As illustrated in FIGS. 6B and 6C, the first image capturing unit 131 captures a 2D image m1 of Room 1, and the second image capturing unit 132 captures a 3D image m2 of Room 1 with depth information.

The cleaning robot 100 determines whether an object regarded as an electric device 300 is recognized, by performing image processing on at least one image between the 2D and 3D images, and checks the type and location information of the electric device 300 using the at least one image upon determining that the object regarded as the electric device 300 is recognized.

Figure 6D:
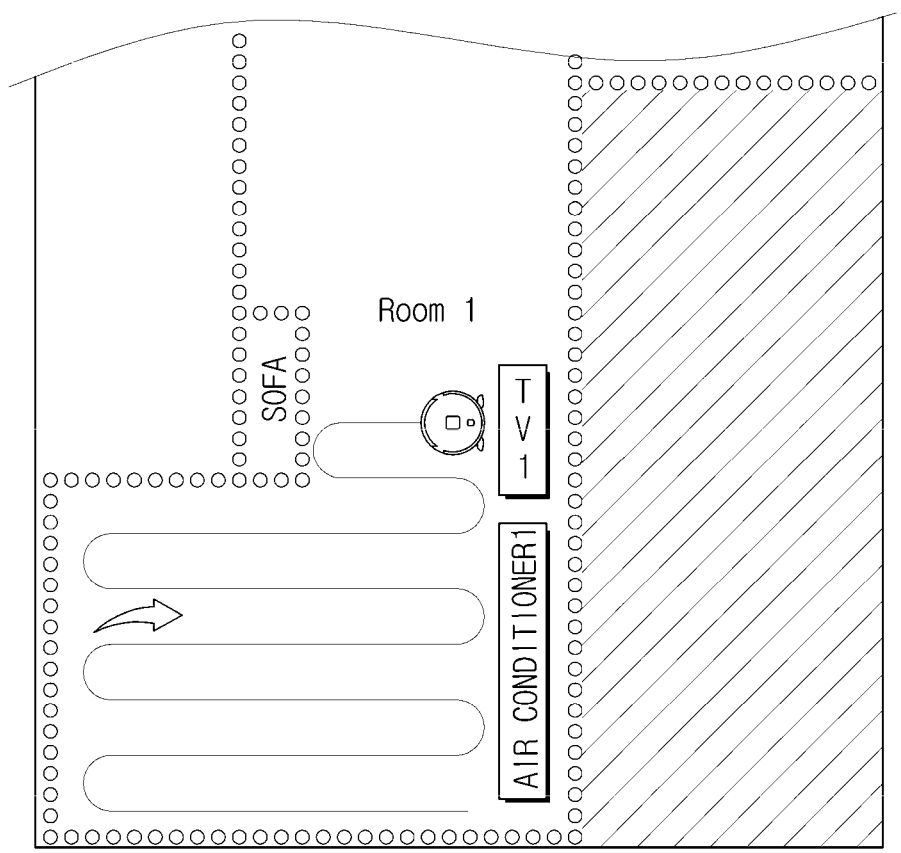

As illustrated in FIG. 6D, the cleaning robot 100 checks a moving distance based on the number of revolutions detected by the revolution detector 152, and checks the location of the main body 100 in a room based on the checked moving distance to obtain X- and Y-axis values.

The cleaning robot 100 detects height information of the electric device 300 based on at least one of the 2D and 3D images to obtain a Z-axis value.

The cleaning robot 100 checks the type of the recognized electric device 300 based on reference images of electric devices stored in the storage 192.

Then, the cleaning robot 100 generates a map of a home by matching basic information and location information corresponding to the type of the recognized electric device 300, to room information of the map.

(3) An example in which the first and second image capturing units 131 and 132 of the imaging unit 130 respectively capture a 2D image and a 3D image and the communication unit 140 communicates with the electric devices 300 is now described.

The cleaning robot 100 generates a map while recognizing a room and checking the location of the main body 110 in the room, based on the 2D and 3D images respectively captured by the first and second image capturing units 131 and 132.

The cleaning robot 100 determines whether basic information is received from an electric device 300, and registers the electric device 300 which has transmitted the basic information, upon determining that the basic information is received.

Then, the cleaning robot 100 detects location information of the electric device 300 by performing image processing on at least one of the 2D and 3D images, and stores the detected location information together with the basic information.

In this case, the cleaning robot 100 obtains X-, Y-, and Z-axis values by detecting plane location information in the room and height information of the electric device 300 based on at least one of the 2D and 3D images.

Alternatively, the cleaning robot 100 may obtain X- and Y-axis values by checking a moving distance based on the number of revolutions detected by the revolution detector 152, and detecting location information of the main body 110 in the room based on the checked moving distance, and may store the obtained X- and Y-axis values as the location information. In this case, the cleaning robot 100 obtains a Z-axis value by detecting height information of the electric device 300 based on at least one of the 2D and 3D images.

Then, the cleaning robot 100 generates a map of a home by matching the received basic information and location information of the electric device 300 to room information of the map.

Figure 7:
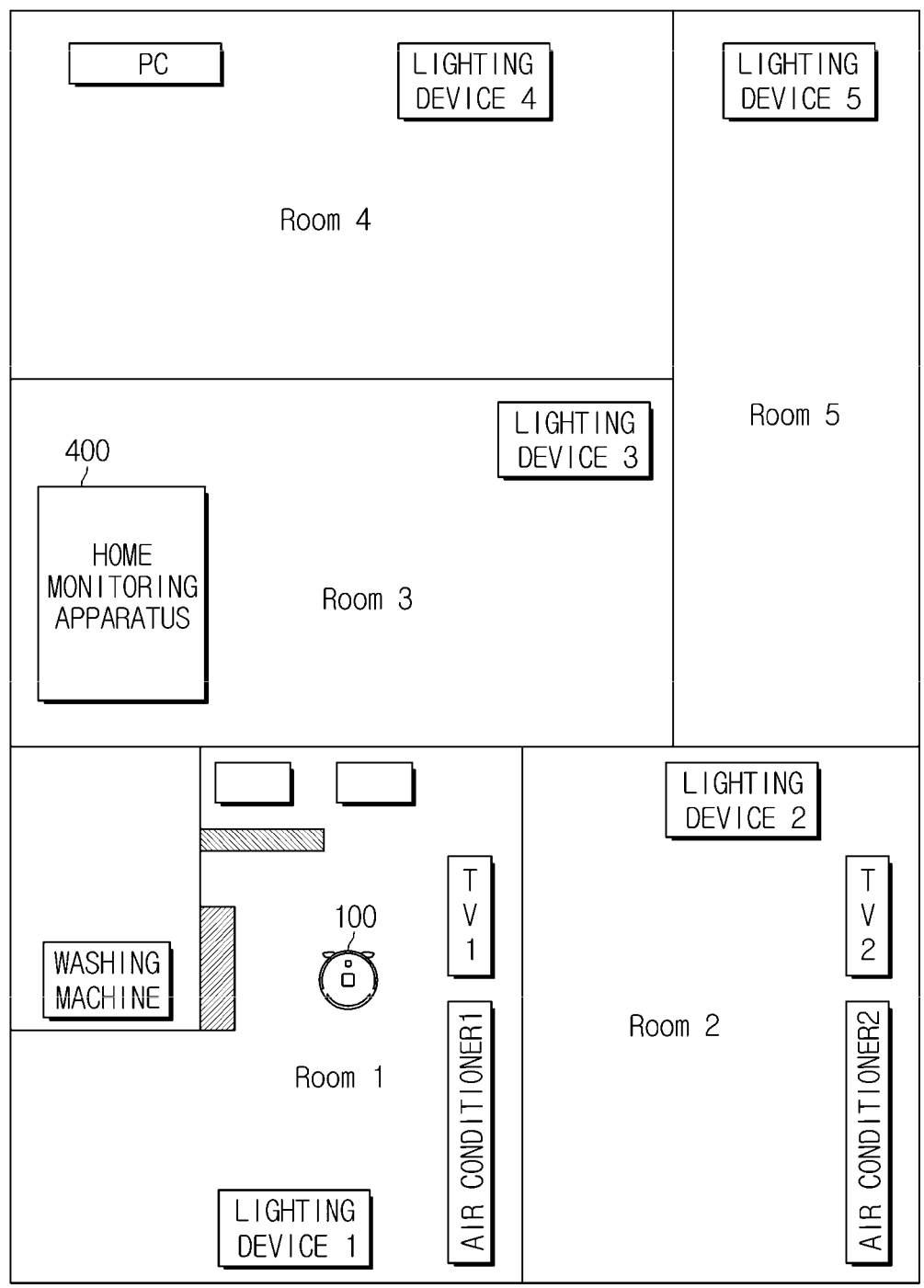
FIG. 7 is a diagram illustrating an example of a map generated by the cleaning robot according to an embodiment of the present disclosure.

FIG. 7 is a diagram illustrating an example of a map generated by the cleaning robot according to an embodiment of the present disclosure.

As illustrated in FIG. 7, the cleaning robot 100 generates a map of a home by spatially distinguishing a plurality of rooms and matching location information of the electric devices 300 of each room to the room. In this case, the structure of the rooms and actual locations of the electric devices 300 are applied to the map. Obstacles inside a home, for example, furniture, may also be applied to the map.

The cleaning robot 100 determines whether the cleaning robot 100 has moved around all rooms of a home at operation 508. Here, the determining of whether the cleaning robot 100 has moved around all rooms includes determining whether a currently recognized room is identical to a previously recognized room.

The cleaning robot 100 terminates the map generating operation upon determining that the cleaning robot 100 has moved around all rooms, stores the map including information about the electric devices 300 at operation 509, and transmits the generated map to the home monitoring apparatus 400 at operation 510.

If a current mode is a cleaning mode, the cleaning robot 100 operates the moving assembly 160 and the cleaning tool (170 and 174) to clean a cleaning area of a home, and recognizes the electric devices 300 while performing cleaning at operation 511.

Here, the electric devices 300 are recognized based on images captured by the first and second image capturing units 131 and 132 and basic information received by the communication unit 140.

The cleaning robot 100 may operate only one of the first and second image capturing units 131 and 132 in a cleaning mode.

The cleaning robot 100 determines whether an object regarded as an electric device 300 is recognized in at least one image at operation 512, and checks the type of the electric device 300 by performing image processing on the at least one image upon determining that the object regarded as the electric device 300 is recognized. In this case, the cleaning robot 100 detects basic information of the electric device 300 by comparing the image to reference images stored in the storage 192.

Alternatively, the cleaning robot 100 may receive the basic information of the electric device 300 from the communication unit 140.

The cleaning robot 100 determines whether the recognized electric device 300 is registered in the storage 192 at operation 513, and registers the recognized electric device 300 as a new device upon determining that the recognized electric device 300 is not registered in the storage 192 at operation 514.

Here, the registering of the recognized electric device 300 as a new device includes updating the map by detecting the type and location information of the recognized electric device 300 and matching basic information corresponding to the type of the recognized electric device 300, and the location information to room information of the map at operation 515, and storing the updated map in the storage 192.

The cleaning robot 100 detects location information of the recognized electric device 300 upon determining that the recognized electric device 300 is previously registered in the storage 192, and determines whether the detected location information is identical to location information stored in the storage 192 at operation 516.

In this case, if the location information of the recognized electric device 300 is identical to the location information of the electric device 300 which is stored in the storage 192, the cleaning robot 100 terminates recognition of the electric device 300. Otherwise, if the location information of the recognized electric device 300 is different from the location information of the electric device 300 which is stored in the storage 192, the cleaning robot 100 updates the map by changing the location information of the electric device 300, which is stored in the storage 192 at operation 517, into the location information of the recognized electric device 300 at operation 515, and stores the updated map in the storage 192.

The cleaning robot 100 may determine whether voice of the user is detected in a cleaning mode, recognize the voice if the voice is detected, and move to a location, from which the voice is recognized, to perform cleaning.

For example, if the user utters in the living room while the cleaning robot 100 is cleaning the kitchen, the cleaning robot 100 checks the location of the user based on voice detected by a microphone array, and moves to the checked location.

In addition, the cleaning robot 100 may recognize voice of the user using one microphone and determine a location to which the user instructs to move.

When the cleaning robot 100 moves to the living room, the cleaning robot 100 may move to a place where the user is located.

If a current location is the recognized location of the user, the cleaning robot 100 determines the state of floor, and performs cleaning upon determining that cleaning is needed.

In addition, if a current location is the recognized location of the user, the cleaning robot 100 performs voice recognition again. In this case, if voice is detected again by the microphone array, the cleaning robot 100 determines the location and command of the user by reducing noise from the detected voice and performing preprocessing for voice recognition. As such, the cleaning robot 100 may recognize the location and command of the user more accurately.

When the cleaning robot 100 moves from the kitchen to the living room, the cleaning robot 100 detects an optimal path based on the map and moves along the detected optimal path.

As another example, the cleaning robot 100 may move to a place where the user is located, recognize the user using the imaging unit 130, recognize the position of the user if the user is recognized, determine the state of floor upon determining that the user looks at the floor, and actively clean the floor upon determining that water is spilled on the floor.

Then, the cleaning robot 100 determines whether cleaning is completed at operation 518, determines whether the map is updated, upon determining that cleaning is completed at operation 519, and transmits the map to the home monitoring apparatus 400 upon determining that the map is updated at operation 510.

Alternatively, the map may be transmitted to the home monitoring apparatus 400 whenever cleaning is completed, without determining whether the map is updated.

Figure 8:
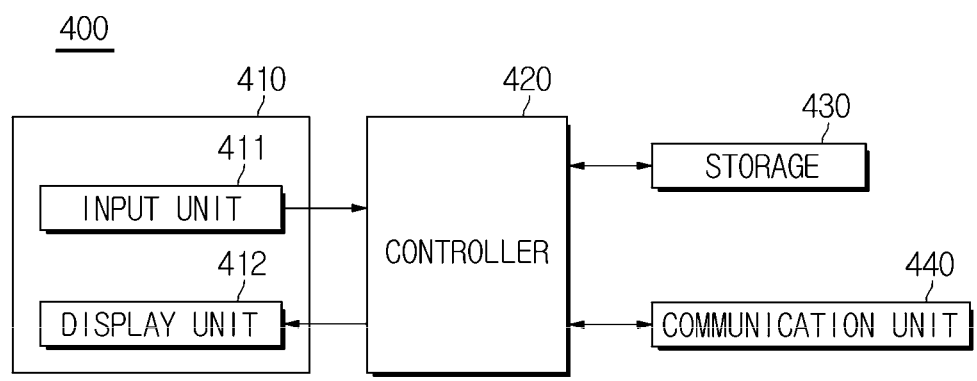
FIG. 8 is a control block diagram of the home monitoring apparatus according to an embodiment of the present disclosure.

FIG. 8 is a control block diagram of the home monitoring apparatus 400, according to an embodiment of the present disclosure. The home monitoring apparatus 400 includes a user interface 410, a controller 420, a storage 430, and a communication unit 440.

The user interface 410 includes an input unit 411 to receive a command from a user, and a display unit 412 to display monitoring information inside home.

Figure 9:
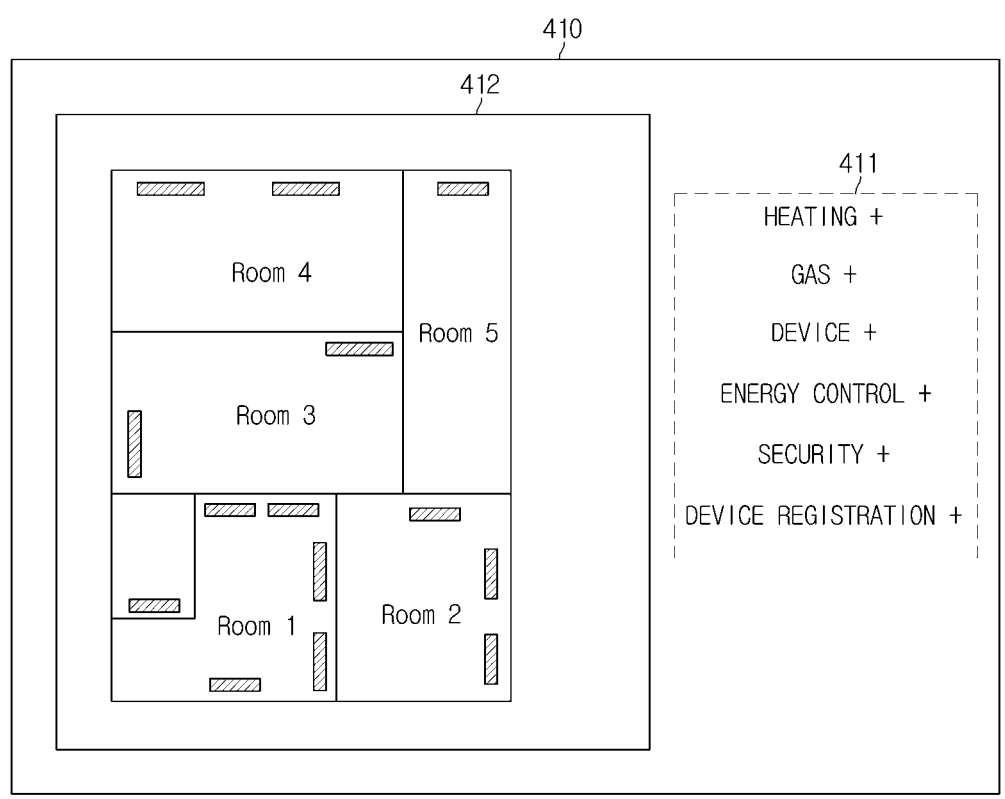
FIG. 9 is a diagram illustrating an example of a user interface of the home monitoring apparatus according to an embodiment of the present disclosure.

FIG. 9 is a diagram illustrating an example of a user interface of the home monitoring apparatus according to an embodiment of the present disclosure.

As illustrated in FIG. 9, the input unit 411 of the user interface 410 includes heating and gas buttons to control heating and gas of each room, a device button to control operations of the electric devices 300 of a home, an energy control button, and a security button, and the display unit 412 displays a map including information about the electric devices 300 of each room. However, it is noted that the user interface 410 is not limited thereto and may include more or less displays and input units.

The input unit 411 of the user interface 410 may further include a device registration button to manually register an electric device 300. As such, an electric device 300 which has not been registered by the cleaning robot 100 may be manually and directly registered by the user.

That is, when the electric device 300 is manually registered, the user may designate a room and a location in the room.

The display unit 412 of the user interface 410 may display the map three-dimensionally.

The input unit 411 of the user interface 410 may be formed as a touch pad, and the display unit 412 may be formed as a touchscreen. Alternatively, the input unit 411 of the user interface 410 may be formed as a touch pad, and the display unit 412 may be formed as an LCD.

If a map is received from the cleaning robot 100, the controller 420 controls storing and displaying of the received map. In this case, the map includes information about the electric devices 300 located in each room of a home.

If the device registration button of the input unit 411 of the user interface 410 is input, the controller 420 switches a currently displayed mode into a manual device registration mode and updates the map by adding device information input to the input unit 411, to the map.

The controller 420 controls display of the display unit 412 of the user interface 410 based on a user command input to the input unit 411, and controls operations of the electric devices 300 based on the input command.

The controller 420 may control energy of each room or each device. A description thereof is now given with reference to FIGS. 10 to 12.

Figure 10:
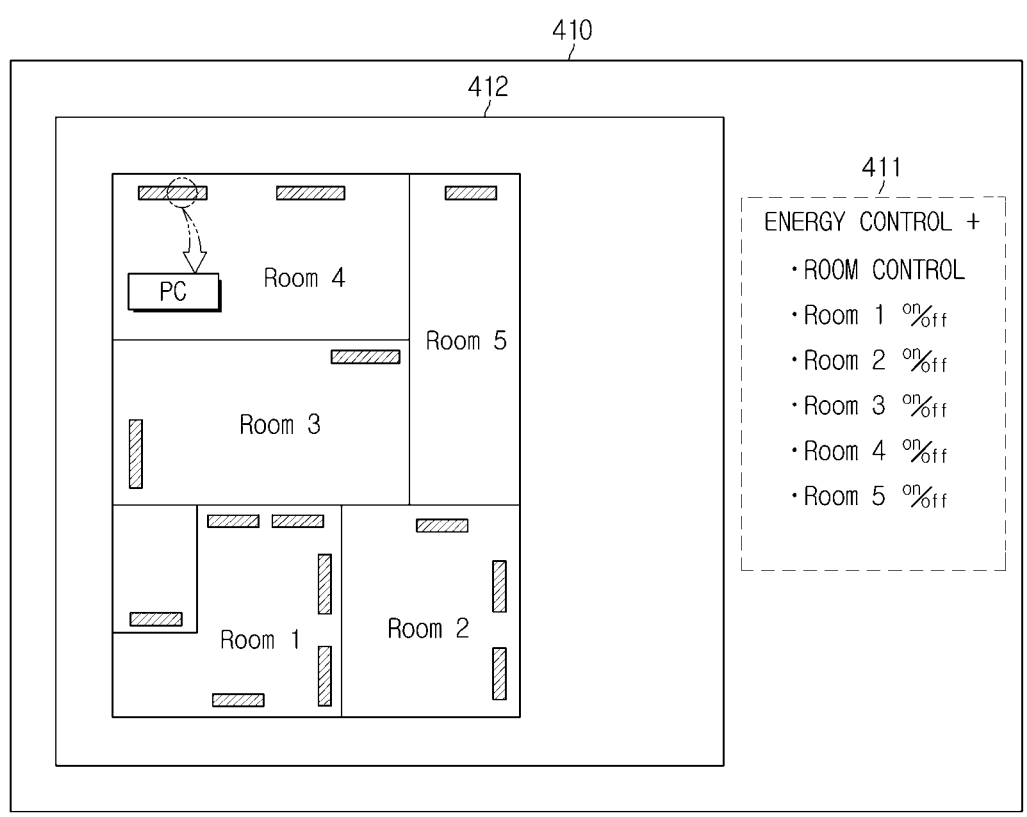
FIGS. 10, 11, and 12 are diagrams illustrating how to control the user interface of the home monitoring apparatus according to an embodiment of the present disclosure.
Figure 11:
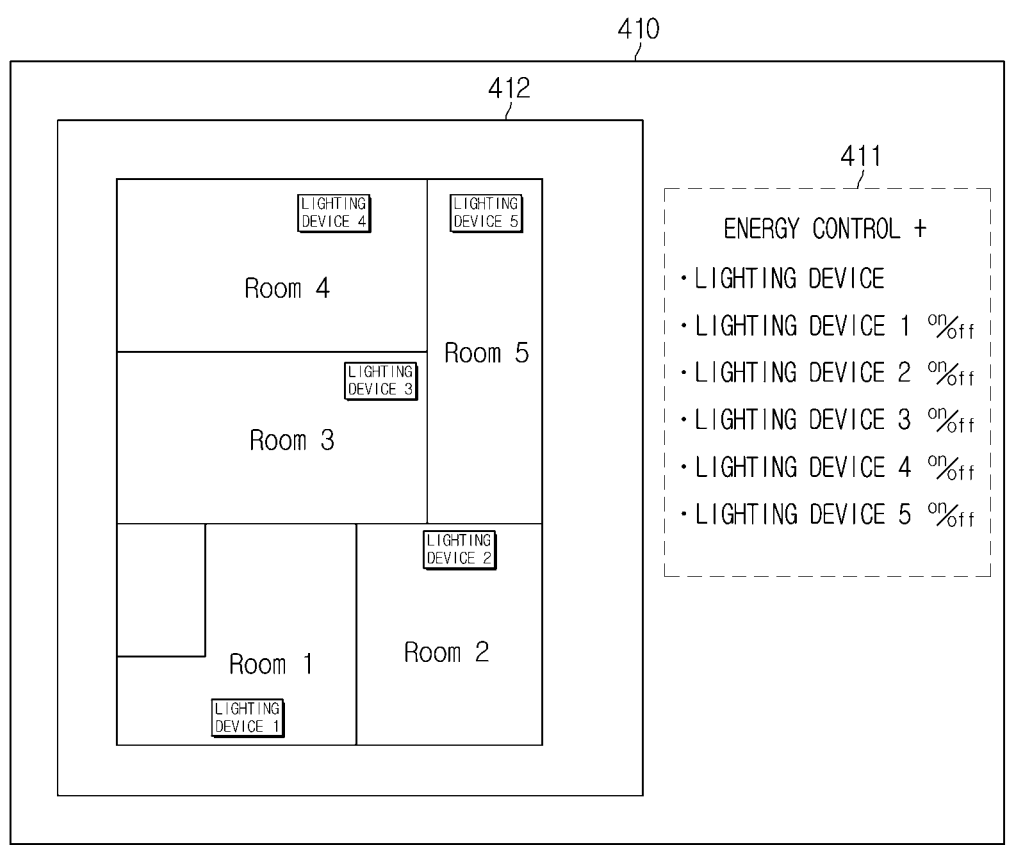
Figure 12:
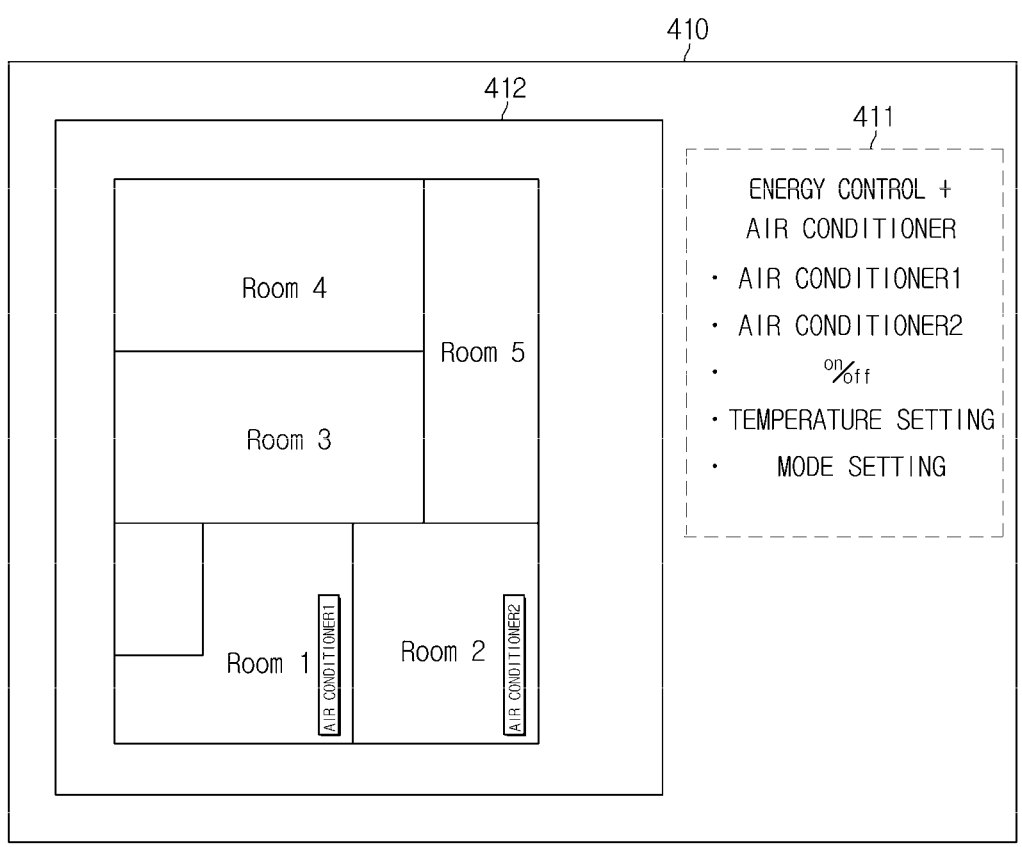

FIGS. 10, 11, and 12 are diagrams illustrating how to control the user interface of the home monitoring apparatus according to an embodiment of the present disclosure.

As illustrated in FIG. 10, the display unit 412 of the user interface 410 displays a map to which location information of the electric devices 300 of each room is matched. In this case, if the user selects any one electric device 300, basic information of the selected electric device 300 is magnified and displayed to be easily recognized by the user.

If a room control button under the energy control button is selected, the user interface 410 outputs indices of a plurality of rooms of a home on the input unit 411. In this case, if the user selects at least one room, power supplied to the electric devices 300 in the selected room is cut off.

For example, if the user selects Room 4, the controller 420 controls power supplied to a Personal Computer (PC) and Lighting Device 4 located in Room 4, to be cut off.

As illustrated in FIG. 11, the display unit 412 of the user interface 410 displays a map to which location information of the electric devices 300 of each room is matched.

If a lighting device button under the energy control button is selected, the user interface 410 outputs indices of a plurality of lighting devices of a home on the input unit 411, and the display unit 412 displays lighting devices of each room.

In this case, indices of the lighting devices displayed on the display unit 412 correspond to the indices of lighting device output on the input unit 411.

The display unit 412 of the user interface 410 may display only the lighting devices selected by the user, instead of displaying all electric devices 300 of a home.

The controller 420 controls power supplied to a lighting device corresponding to an index selected by the user.

For example, if the user selects Lighting Device 4 on the input unit 411, the controller 420 controls power supplied to Lighting Device 4 located in Room 4, to be cut off.

As illustrated in FIG. 12, the display unit 412 of the user interface 410 displays a map to which location information of the electric devices 300 of each room is matched. If an air conditioner button under the energy control button is selected, the user interface 410 outputs indices of air conditioners of a home on the input unit 411, and the display unit 412 displays air conditioners located in each room.

In this case, indices of the air conditioners displayed on the display unit 412 correspond to the indices of air conditioners output on the input unit 411.

The display unit 412 of the user interface 410 may display only the air conditioners selected by the user, instead of displaying all electric devices 300 of a home, or display the air conditioners differently from the other electric devices.

The controller 420 controls power supplied to an air conditioner corresponding to an index selected by the user.

In addition, the controller 420 may control operation of the air conditioner selected by the user, for example, temperature setting and mode setting.

For example, if the user selects Air Conditioner2 on the input unit 411, the controller 420 controls a selection indication of Air Conditioner2 located in Room 2 to identify that Air Conditioner2 is selected. In this case, if the user selects an off button, the controller 420 controls power supplied to Air Conditioner2, to be cut off.

Here, the controlling of the selection indication includes displaying Air Conditioner2 on the display unit 412 with a blinking effect or using a different color.

If power consumption information is received from the electric devices 300, the controller 420 predicts power consumption of the electric devices 300 of each room to predict total power consumption of a home, and controls information about the predicted power consumption to be displayed on the display unit 412. That is, the home monitoring apparatus 400 provides information about power consumption to the user.

If operation information is received from the electric devices 300, the controller 420 controls the operation information of each electric device 300 to be displayed on the display unit 412.

The controller 420 may provide information for efficient energy control based on the power consumption information of each room.

The controller 420 monitors safety information related to security, gas leakage, etc., and controls the safety information to be informed to the user.

That is, the controller 420 may manage information about a user terminal or a server outside home, and control providing of a home monitoring information thereto.

The storage 430 stores a map to which information about the electric devices 300 is matched.

The storage 430 stores basic information, operation information, power consumption information, etc. of at least one electric device 300.

The communication unit 440 communicates with the cleaning robot 100 and the electric devices 300.

That is, the communication unit 440 receives the map to which information about the electric devices 300 is matched, from the cleaning robot 100, and also receives operation information of the cleaning robot 100.

In addition, the communication unit 440 receives operation information and power consumption information from at least one electric device 300, and transmits a control command to at least one electric device 300.

The communication unit 440 communicates using various wired/wireless communication protocols such as ZigBee, Z-Wave, WiFi, and Ethernet.

Furthermore, the communication unit 440 may communicate with a user terminal to transmit home monitoring information to the user.

Besides, the communication unit 440 may communicate with a server outside home to transmit home monitoring information to the server.

Figure 13:
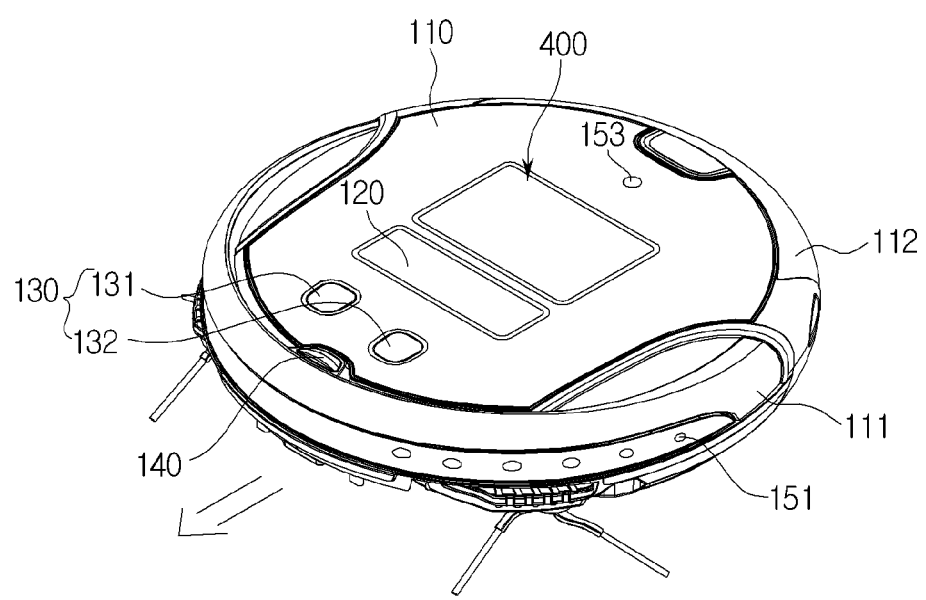
FIG. 13 is a perspective view of a cleaning robot according to another embodiment of the present disclosure.

FIG. 13 is a perspective view of a cleaning robot according to another embodiment of the present disclosure.

Unlike the previous various embodiments in which the home monitoring apparatus 400 is provided on the wall of one of a plurality of rooms of a home, a home monitoring apparatus 400 according to the current embodiment is provided on a main body 110 of the cleaning robot 100.

As illustrated in FIG. 13, the cleaning robot 100 includes the main body 110 to form an external shape, a bumper 111 mounted at a front side of the main body 110 to cushion the impact of a collision with an obstacle, a user interface 120 mounted on a top surface of the main body 110 to receive operation information and reservation information and to display operation information, an imaging unit 130 (131 and 132) integrally mounted on the top surface of the main body 110 to obtain images around the main body 110 in a cleaning area, and a communication unit 140 to communicate with an external device such as a charger station 200.

Here, the obtained images are used to generate a map of a home and to recognize a plurality of electric devices 300 of a home. The obtained images may also be used to recognize the location of the main body 110 and to detect obstacles in a cleaning mode.

The imaging unit 130 includes a first image capturing unit 131 and a second image capturing unit 132. The first and second image capturing units 131 and 132 may be aligned in a traveling direction as illustrated in FIG. 13, or in a direction perpendicular to the traveling direction.

The bumper 111 may be further mounted at a rear side of the main body 110.

The cleaning robot 100 further includes a dustbin 112 provided at a rear side of the main body 110 near a main brush assembly 170 to accommodate foreign substances such as dust collected by the main brush assembly 170.

The cleaning robot 100 may further include an obstacle detector 151 mounted at front, left, and right sides of the main body 110 to detect obstacles located at front, left, and right sides of the cleaning robot 100.

The cleaning robot 100 may use an obstacle detection signal detected by the obstacle detector 151, to generate the map. For example, the cleaning robot 100 may recognize furniture such as a sofa or dining table as an obstacle and apply the recognized furniture to the map.

The cleaning robot 100 may further include a sound detector 153 provided on the main body 110 to detect sound near the main body 110.

Map generating and cleaning of the cleaning robot 100 are described above in the previous various embodiments and thus are not described here.

The cleaning robot 100 further includes the home monitoring apparatus 400 provided on the top surface of the main body 110.

Here, the home monitoring apparatus 400 applies smart home solutions to home and performs a variety of functions such as security monitoring, visitor checking, phone calling, door opening, entrance and exit control, and event notification as well as home control functions such as lighting control, gas valve control, heating control, energy consumption checking, energy control, and device control based on a user interface.

The home monitoring apparatus 400 communicates with the electric devices 300. The home monitoring apparatus 400 also communicates with a monitoring device for security.

The home monitoring apparatus 400 receives and displays the map to which location information of at least one electric device 300 is matched.

The home monitoring apparatus 400 receives operation information from the electric devices 300, and transmits a control command to at least one of the electric devices 300.

Here, the control command is input by a user or determined based on the power state of a home.

Specific functions of the home monitoring apparatus 400 are described above in the previous various embodiments and thus are not described here.

Figure 14:
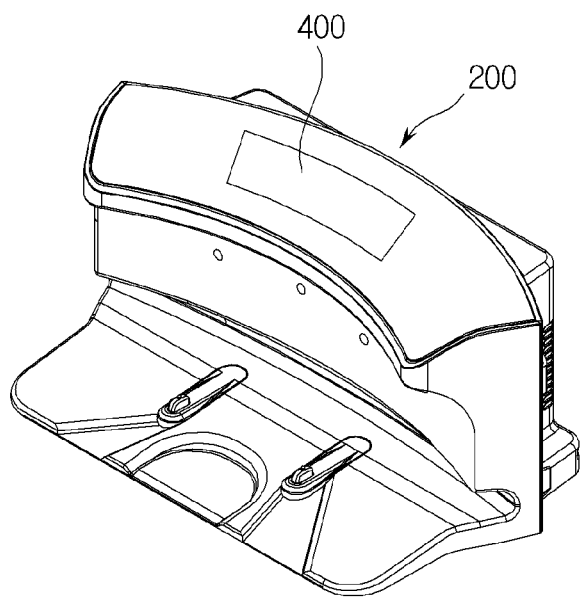
FIG. 14 is a perspective view of a cleaning robot according to another embodiment of the present disclosure.

FIG. 14 is a perspective view of a cleaning robot according to another embodiment of the present disclosure.

Unlike the previous various embodiments in which the home monitoring apparatus 400 is provided on the wall of one of a plurality of rooms of a home, a home monitoring apparatus 400 according to the current embodiment is provided on a charger station 200 to supply power for charging to the cleaning robot 100.

The charger station 200 includes a transformer connected to an external commercial AC power supply to receive and convert commercial AC power, a rectifier to half-wave or full-wave rectify the converted power, a smoother to smooth the rectified power, and a voltage adjuster to output the smoothed power as DC power having a specific voltage, and the DC power output from the voltage adjuster is supplied to the cleaning robot 100 through a power terminal.

The charger station 200 further includes a docking communication unit (not shown) to transmit and receive a docking signal for docking of the cleaning robot 100, to and from the cleaning robot 100.

The charger station 200 further includes the home monitoring apparatus 400 provided on a top surface of the charger station 200 to be easily recognized by the user.

The home monitoring apparatus 400 receives driving power supplied from the charger station 200 and operates using the supplied power.

The home monitoring apparatus 400 provided on the charger station 200 communicates with the cleaning robot 100 and a plurality of electric devices 300. The home monitoring apparatus 400 also communicates with a monitoring device for security.

The home monitoring apparatus 400 receives a map to which location information of at least one electric device 300 is matched, from the cleaning robot 100, and displays the map.

The home monitoring apparatus 400 receives operation information from the electric devices 300, and transmits a control command to at least one of the electric devices 300.

Specific functions of the home monitoring apparatus 400 are described above in the previous various embodiments and thus are not described here.

A procedure to match location and type information of electric devices to a 2D or 3D map of a home may be automated.

As described above, a map of a home may be realistically generated by utilizing a map generated by a cleaning robot for cleaning, to manage a home, and inconvenience experienced by a user to manually register electric devices located in each room may be solved by automatically registering the electric devices.

As is apparent from the above description, since a map of a home is generated using a cleaning robot and used as a map for home monitoring service, inconvenience caused by manually inputting the map of a home may be solved and inconvenience of a user to manually register electric devices located in each room may also be solved.

A smart home may be constructed by independently or integrally controlling power for rooms of a home.

In this case, power consumed by unused rooms may be saved. That is, power of a home may be controlled for each room.

Furthermore, electric devices located in each room may be easily checked using a home monitoring apparatus.

Besides, a home monitoring apparatus may be provided on a cleaning robot which is always powered on. That is, the home monitoring apparatus may be provided on a charger station or main body of the cleaning robot.

As such, a new smart home service may be expected.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A cleaning robot comprising:
a main body;
a moving assembly configured to move the main body around a home;
an image capturer configured to obtain images around the main body;
a communicator configured to communicate with an electric device and a home monitoring apparatus; and
a controller configured to:
generate a map of the home using the obtained images, and
identify location information of the electric device if communication of the electric device is performed,
wherein the communicator is further configured to transmit the generated map, the identified location information and information of the electric device to the home monitoring apparatus.

2. The cleaning robot according to claim 1, wherein the communicator is further configured to communicate with an electric device disposed near the main body to receive basic information from the electric device.

3. The cleaning robot according to claim 2, wherein the controller is further configured to:
match the basic information of the electric device to the identified location information in the generated map,
wherein the communicator is further configured to transmit the generated map to which the basic information of the electric device is matched, to the home monitoring apparatus.

4. The cleaning robot according to claim 1, wherein the controller is further configured to:
perform image processing on the images, and
identify the location information of the electric device in the image-processed images.

5. The cleaning robot according to claim 1, further comprising:
a cleaning tool configured to collect foreign substances on a floor of the home, wherein the controller is further configured to:
control operations of the moving assembly and the cleaning tool if a current mode is a cleaning mode,
communicate with an electric device of the home while performing cleaning,
determine whether the communicated electric device is a new electric device or a pre-registered electric device, and
update the map upon determining that the communicated electric device is the new electric device.

6. The cleaning robot according to claim 5, further comprising:
a voice detector configured to detect voice,
wherein the controller is further configured to control the moving assembly to move to a location corresponding to the detected voice.

7. The cleaning robot according to claim 6,
wherein the voice detector comprises a microphone array, and
wherein the controller is further configured to recognize a location corresponding to a voice detected by the microphone array.

8. The cleaning robot according to claim 7, wherein the controller is further configured to:
recognize the voice detected by the microphone array, and
determine a room designated by the recognized voice.

9. The cleaning robot according to claim 6,
wherein the voice detector comprises one microphone, and
wherein the controller is further configured to:
recognize a voice detected by the microphone, and
determine a room designated by the recognized voice.

10. The cleaning robot according to claim 1, wherein the home monitoring apparatus is located at a charger station to supply power to the main body, and displays information about electric devices matched to the map of the home.

11. The cleaning robot according to claim 1, wherein the home monitoring apparatus is located at the main body, and displays information about electric devices matched to the map of the home.

12. A cleaning robot, comprising:
a main body;
a moving assembly configured to move the main body around a home;
an image capturer including a first image capturing unit and a second image capturing unit aligned at different locations of the main body,
wherein the first image capturing unit and the second image capturing unit are configured to obtain two-dimensional (2D) images around the main body, respectively;

a controller configured to:
  perform image processing on the captured 2D images to obtain a three-dimensional (3D) images recognize an electric device based on the obtained 3D images, and
  generate a map to which the recognized electric device is matched; and
a communicator configured to transmit the map to which the recognized electric device is matched, to a home monitoring apparatus.

13. A cleaning robot, comprising:
a main body;
a moving assembly configured to move the main body around a home;
an image capturer including a first image capturing unit configured to capture two-dimensional (2D) images and a second image capturing unit configured to capture three-dimensional 3D images;
a controller configured to:
  generate a map by distinguishing rooms of the home based on the 3D images,
  perform image processing on at least one of the 2D and 3D images to recognize electric device, and
  generate the map to which the recognized electric device are matched; and
a communicator configured to transmit the map to which the electric device are matched, to a home monitoring apparatus.

14. The cleaning robot according to claim 13, wherein the controller is further configured to:
  identify location information of an electric device if the electric device is recognized, and
  match information of the electric device having the identified location information into the map.

15. The cleaning robot according to claim 14, further comprising:
  a storage configured to store the location information of the electric device using 3-axis values.

16. A method for controlling a cleaning robot having a main body, a moving assembly configured to move the main body around a home, and an image capturer configured to obtain images around the main body, the method comprising:
  determining whether an operation command is a command to execute a map generating mode if the operation command is input;
  operating and moving the moving assembly around the home if the operation command is a command to execute a map generating mode;
  obtaining a plurality of two-dimensional (2D) images around the main body while moving around the home;
  generating three-dimensional (3D) images using the 2D images;
  generating a map of the home based on the obtained 2D images of the generated 3D images;
  recognizing an electric device disposed around the home by performing image processing on the generated 3D images;
  matching the recognized electric device to the generated map; and
  transmitting the map to which the electric device is matched, to a home monitoring apparatus.

17. The method according to claim 16, wherein the recognizing of the electric device comprises:
  distinguishing rooms of the home using the generated 3D images; and
  recognizing an electric device of each room.

18. A method for controlling a cleaning robot having a main body, a moving assembly configured to move the main body around a home, and an image capturer configured to obtain images around the main body, the method comprising:
  determining whether an operation command is a command to execute a map generating mode if the operation command is input;
  operating and moving the moving assembly around the home if the operation command is a command to execute a map generating mode;
  obtaining a plurality of two-dimensional (2D) images and three-dimensional (3D) images around the main body while moving around the home;
  recognizing an electric device disposed around the home by performing image processing on the obtained 3D images;
  generating a map of the home based on the obtained 2D images or the obtained 3D images;
  matching the recognized electric device to the generated map; and
  transmitting the map to which the electric device is matched, to a home monitoring apparatus.

19. The method according to claim 18, wherein the recognizing of the electric device comprises:
  distinguishing rooms of the home using the 3D images; and
  recognizing the electric device of each room using at least one of the 2D and 3D images.

20. A method for controlling a cleaning robot having a main body, a moving assembly configured to move the main body around a home, and an image capturer configured to obtain images around the main body, the method comprising:
  determining whether an operation command is a command to execute a map generating mode if the operation command is input;
  determining whether communication of the electric device is performed;
  identifying location information of the electric device upon determining communication of the electric device is performed; and
  transmitting the generated map, the identified location information and information of the electric device, to a home monitoring apparatus.

21. The method according to claim 20, further comprising:
  operating and moving the moving assembly around the home to perform cleaning if the operation command is a command to execute a cleaning mode;
  obtaining images around the main body while performing cleaning;
  identifying location information of an electric device by performing image processing on the obtained images,
  wherein the communicating of the electric device further comprises:
    determining whether the communicated electric device is a new electric device;
    identifying basic information and location information of the communicated electric device upon determining that the communicated electric device is a new electric device; and
  updating the map by matching the identified basic information and location information of the electric device to the map.

22. The method according to claim 21, further comprising:

identifying location information of the communicated electric device upon determining that the communicated electric device is a pre-registered electric device;

determining whether the identified location information of the electric device is identical to pre-stored location information of the electric device; and updating the map by re-storing the location information of the electric device as the identified location information if the detected location information is different from the pre-stored location information.

23. The method according to claim 22, further comprising re-transmitting the updated map to the home monitoring apparatus.

24. The method according to claim 21, wherein the communicating of the electric device further comprises determining whether basic information is received from at least one electric device, while moving around the home.

* * * * *